UNITED STATES PATENT OFFICE.

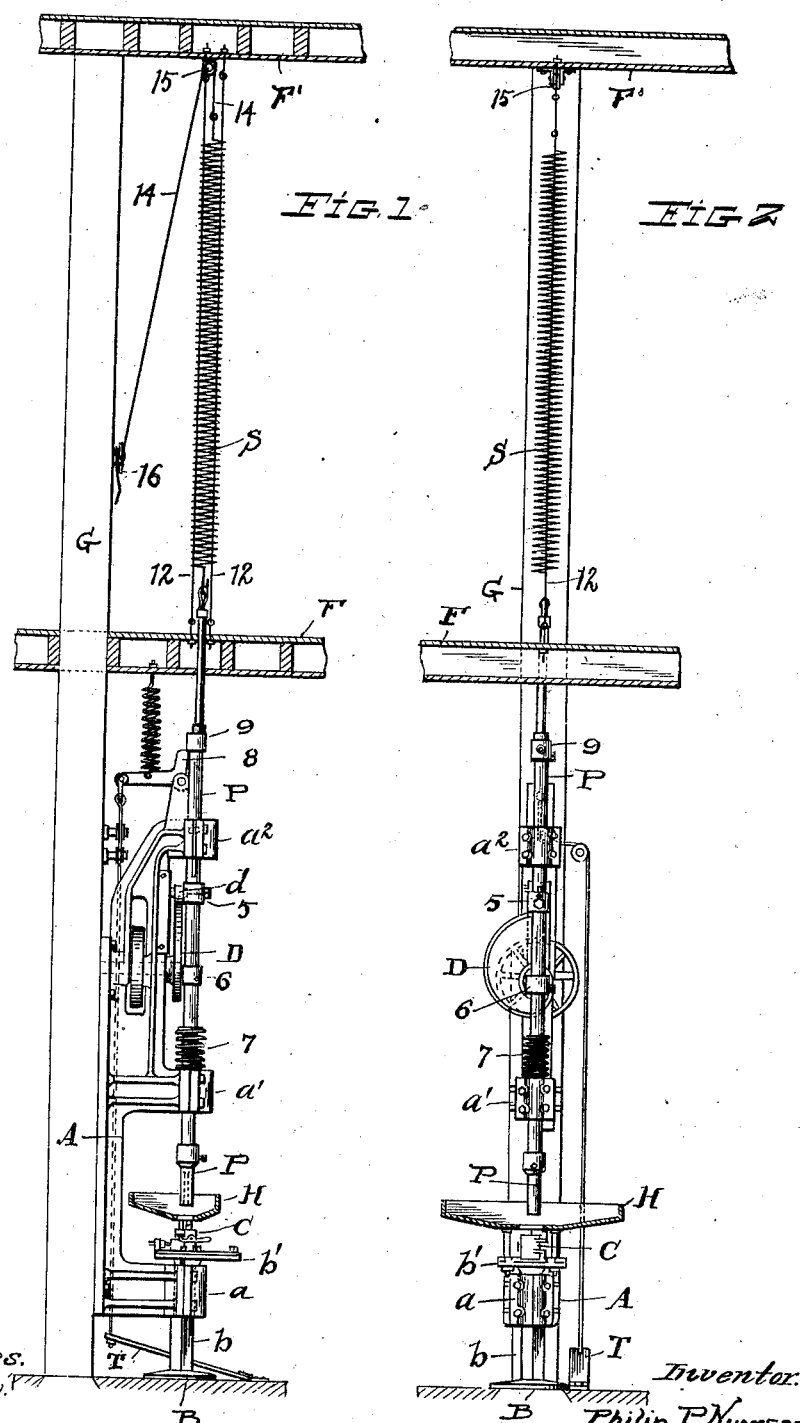

PHILIP P. NUNGESSER, OF CLEVELAND, OHIO, ASSIGNOR TO THE NUNGESSER ELECTRIC BATTERY COMPANY, OF CLEVELAND, OHIO, A CORPORATION.

MACHINE FOR FILLING DRY BATTERIES.

990,823. Specification of Letters Patent. Patented Apr. 25, 1911.

Application filed November 25, 1910. Serial No. 594,003.

*To all whom it may concern:*

Be it known that I, PHILIP P. NUNGESSER, a citizen of the United States, residing at Cleveland, in the county of Cuyahoga and State of Ohio, have invented certain new and useful Improvements in Machines for Filling Dry Batteries, of which the following is a specification.

The invention herein shown and described relates to a machine for filling dry batteries, and is an improvement on the machine for which I filed an application for patent on the 4th day of August, 1908, Ser. No. 446,903.

In the accompanying drawings, Figures 1 and 2 are side elevations of the machine at right angles, respectively, to each other.

The novelty of this application resides for the most part in the portion of the machine shown as above the floor F, and the parts below said floor are substantially the same as are present in the original application above mentioned and therefore are not claimed herein except as they combine with the new features shown. In this connection it is important to understand the conditions arising out of the use of the original machine which have led to the present improvement. Thus, in filling dry battery cells or cans with the usual compound or mixture in a suitably refined state a certain density or compactness of the material in the cell is necessary, and the degree or measure of such density may be varied according to the condition or character of the material and the size or kind of battery. Of course, cells of a given kind should be absolutely uniform in all particulars and up to the standard whatever it may be, and there should be no appreciable variation in such cells as they are filled in any given day or from day to day, or in the compactness or density of the material in the cell or can comparing the different strata herein with each other, as the upper portion of the cell with the lower portion. This important consideration leads directly to certain difficulties experienced in using the construction of the tamping mechanism in the original machine above mentioned, particularly when a series of such machines are used in a shop to produce a uniform daily output. For example, I have found that in a machine as delicately organized and balanced as this kind of a machine necessarily must be to get the desired results there is a constant sensitiveness present to what would seem to be immaterially small differences or influences, such as variable friction, wear, looseness or tightness of parts, changes of weather or temperature in the room, or possible imperceptible differences in the material or carbon as compared day by day or one batch with another, or the like, and in the end these differences are almost sure to work out in more or less pronounced differences in the operation of different machines and consequently in the cells as compared one with another and to the obvious discredit of the battery. Now, my object is to provide a simple machine which may be conveniently adjusted and set to produce uniform results and with such reliability that a series of such machines may be operated daily to produce batteries of absolutely like test and standard.

Now, recognizing that the original machine falls short in some of the particulars just noted I have sought to improve the same and to turn out work that is up to standard at all times in all sizes of cells and under all usual conditions of operation, and the first and most important change consists in the spring which is directly connected with and modifies the operation of the tamping bar or plunger P. Said plunger is supported as before in arms or projections $a'$, $a^2$, from the main frame A, while a like arm $a$ supports a post or standard $b$ which has a firm broad base B in the foundations beneath and is adapted to support the battery cell or can thereon, the top of said standard having a broadened or flanged head $b'$ for this purpose. The usual hopper H to receive the loose material for the battery also is shown and has a hole in its bottom adapted to accommodate plunger P as it reciprocates and tamps the material in the can temporarily placed in the casing C beneath for filling, as fully set forth in the said original application.

Reciprocation is imparted to the plunger through rotatable cam D which engages a roller or wheel $d$ supported by adjustable collar 5 on the plunger. Another adjustable collar, 6, on the plunger lower down is adapted to engage a spiral spring 7 about the plunger over arm $a'$ and which serves as a cushion for the down stroke, as formerly. A crank shaped stop 8 is adapted to swing in under a collar 9 on the plunger and intercept the down stroke when tamping is to be suspended, and this stop or lever is controlled by treadle T also as formerly. These details are given from the original application in order to lay the ground work for the novel features of the present improvement and which essentially involve the relatively long sustaining or suspensory spring S for the plunger. Originally, a spring was shown about the top of the plunger which rested between a collar thereon and a fixed stop above and wherein said spring was compressed on the up stroke of the plunger and exerted tension on the down or tamping stroke, thus emphasizing the stroke or blow of the plunger accordingly. By my present invention the said spring is dispensed with and instead I employ one which has a constant upward pull on the plunger to relieve or reduce the weight or blow more or less as working conditions may require. The plunger used weighs say about 75 or 80 pounds and has a free sliding movement in its bearings and hence will impart its entire weight to the material to be tamped if not relieved by spring S. But I do not employ all this weight in the work, and in fact for average cell or battery tamping I find that about twenty or twenty-five pounds of stroke by actual weight is enough. Of course conditions vary and therefore I do not care to be too specific as to this, but assuming that I need a twenty-five stroke and have a plunger of seventy-five pounds actual weight I take up the difference in or by the spring S. The said spring is approximately eight feet in length as herein shown, thus providing many coils which furnishes a very free and elastic-working spring, and is engaged with the extremity of plunger P above floor F and attached to cord 14 running over sheave 15 on the bottom or ceiling of floor F' at its upper end. Guide wires or rods 12 for said spring are drawn taut between said floors and keep the spring straight at all times. Cord 14 connects with the upper end of the spring and thence passes downward over sheave 15 with its other end wound about or fastened upon a button or other sufficient holder 16 on the post or upright G. The said cord arranged as shown serves to take up spring S more or less as more or less weight is wanted in plunger P for tamping purposes. If, for example, the illustration above mentioned be used the said spring would be drawn upward until it would absorb about fifty pounds of the plunger, thus leaving twenty-five pounds or one-third of its weight for stroke. This extreme tension can of course be reduced by releasing the said cord and relieving the spring even to the point where it will exercise practically no lift at all, as is obvious, so that a very wide range of adjustment is thus afforded. Again, I have found it of first importance that there should be uniform tamping in the cell its full depth top to bottom as above indicated, and an exceptionally long spiral spring like the one shown is admirably adapted to give this result and which would be impossible by a comparatively short spring however arranged. By this means if the plunger be set to impart a certain tamping blow in the bottom of the cell, say twenty-five pounds, it will deliver the same measure or weight of blow successively the full depth of the cell while the stroke variably decreases as the can fills, and the material will be equally dense or compact throughout, when the work is finished. The same result will be manifest in all the cells through a day's run, or longer, regardless of the number of machines used when all are set to produce like results, but if there should be found to be any variance as ascertained by a test of the cells or batteries as compared with standard requirements the discrepancy can easily be remedied in any machine through the cord 14.

What I claim is:

1. In a machine for filling dry batteries, a variable reciprocating tamping plunger having a relatively long spring to constantly sustain a portion of the weight of the plunger during operation thereof.

2. A machine for filling dry batteries comprising a tamping plunger having a spring operatively connected in suspensory relation therewith and means to elongate or shorten said spring for the purposes set forth.

3. A machine for filling dry batteries comprising a tamping plunger, a spring adapted to be elongated and supported to constantly carry part of the weight of said plunger, and means to vary the tension of said spring.

4. A machine for filling dry batteries comprising a reciprocating plunger, a spiral spring in constant suspensory relation with the upper end thereof and positive means coöperating with said spring to raise the plunger.

5. A machine for filling dry batteries comprising a tamping plunger and a rotatable member for positively raising the same, in combination with a relatively long spiral spring attached to the upper end of said plunger to support part of the weight thereof.

6. A machine for filling dry batteries having a reciprocating plunger and means to positively lift the same to dropping position, in combination with a suspensory spiral spring carrying part of the weight of said plunger, and means adapted to change the tension of the spring more or less and thereby change its carrying effect on said plunger.

7. A machine for filling dry batteries comprising a variably-reciprocating tamping plunger and a support for a battery cell axially beneath the same, in combination with a suspensory spring-support for said plunger adapted to cause a variably-cushioned tamping blow to be delivered from bottom to top of said cell.

8. A machine for filling dry batteries having a reciprocating plunger adapted to tamp by gravity, means to raise said plunger to dropping position, self-yielding means connected with said plunger to partially absorb the weight of the plunger during constant tamping operations, and a controlling device to vary the working action of said self-yielding means.

9. A machine for filling dry batteries comprising a gravity plunger, a spiral spring in axial connection with the upper end thereof adapted to carry a part of the weight of said plunger throughout its working movements, and a spring for said plunger to cushion its first down strokes.

10. The combination of a gravity tamping plunger and means to raise the same to dropping position, in combination with a suspensory spiral spring attached to the top of the plunger, means to elongate said spring to variably absorb part of the weight thereof, and a compressible spring about the lower portion of said plunger adapted to cushion the initial strokes thereof in tamping a cell.

In testimony whereof I affix my signature in the presence of two witnesses.

PHILIP P. NUNGESSER.

Witnesses:
F. C. MUSSUN,
E. M. FISHER.

Copies of this patent may be obtained for five cents each, by addressing the "Commissioner of Patents, Washington, D. C."